(12) United States Patent
Pazinski et al.

(10) Patent No.: US 12,529,336 B2
(45) Date of Patent: Jan. 20, 2026

(54) GAS TURBINE ENGINES INCLUDING EMBEDDED ELECTRICAL MACHINES AND ASSOCIATED COOLING SYSTEMS

(71) Applicants: General Electric Company Polska sp. z o.o., Warsaw (PL); General Electric Company, Schenectady, NY (US)

(72) Inventors: Adam Tomasz Pazinski, Warsaw (PL); Miroslaw Sobaniec, Grodzisk Mazowiecki (PL); Christopher N. Delametter, Mechanicville, NY (US)

(73) Assignees: General Electric Company, Evendale, OH (US); General Electric Company Polsa sp. z o.o, Warsaw (PL)

( * ) Notice: Subject to any disclaimer, the term of this patent is extended or adjusted under 35 U.S.C. 154(b) by 0 days.

(21) Appl. No.: 18/378,974

(22) Filed: Oct. 11, 2023

(65) Prior Publication Data

US 2024/0167422 A1    May 23, 2024

Related U.S. Application Data

(62) Division of application No. 17/400,936, filed on Aug. 12, 2021, now Pat. No. 11,891,954.

(30) Foreign Application Priority Data

Aug. 20, 2020  (PL) .......................... 435035

(51) Int. Cl.
    *F02C 7/18*    (2006.01)
    *F02C 6/00*    (2006.01)
(52) U.S. Cl.
    CPC .................. *F02C 7/18* (2013.01); *F02C 6/00* (2013.01); *F05D 2220/76* (2013.01)

(58) Field of Classification Search
    CPC .... F02C 7/18; F05D 2220/76; F04D 29/5806; F04D 29/5813
    See application file for complete search history.

(56) References Cited

U.S. PATENT DOCUMENTS 3,791,682 A   2/1974   Mitchell
3,816,751 A   6/1974   Jampen et al.
(Continued)

FOREIGN PATENT DOCUMENTS

CN   109642473 A   4/2019
CN   110725748 A   1/2020
(Continued)

OTHER PUBLICATIONS

Chinese Office Action for Application No. 202110949892.X dated Jan. 26, 2024 (27 pages with English Translation).
(Continued)

*Primary Examiner* — Katheryn A Malatek
(74) *Attorney, Agent, or Firm* — Dority & Manning, P.A.

(57) ABSTRACT

A gas turbine engine includes a fan located at a forward portion of the gas turbine engine. A compressor section and a turbine section are arranged in serial flow order. The compressor section and the turbine section together define a core airflow path. A rotary member is rotatable with at least a portion of the compressor section and with at least a portion of the turbine section. An electrical machine is coupled to the rotary member and is located at least partially inward of the core airflow path in a radial direction. An enclosure at least partially encloses the electrical machine. The enclosure at least partially defines a first cooling airflow path within the enclosure that at least partially defines a first cooling airflow buffer cavity at least partially around the electrical machine. The first cooling airflow path is in communication with a second cooling airflow path located outside the enclosure that at least partially defines a second (Continued)

cooling airflow buffer cavity at least partially around the enclosure. A cooling duct provides pressurized air to the first cooling airflow path such that the air flows along both the first cooling airflow path and the second cooling airflow path providing the first cooling airflow buffer cavity and the second cooling airflow buffer cavity.

8 Claims, 7 Drawing Sheets

(56) References Cited

U.S. PATENT DOCUMENTS

| | | | |
|---|---|---|---|
| 4,474,001 | A | 10/1984 | Griffin et al. |
| 6,294,842 | B1 | 9/2001 | Skowronski |
| 9,038,398 | B2 | 5/2015 | Suciu et al. |
| 9,097,134 | B2 | 8/2015 | Ferch et al. |
| 9,917,490 | B2 | 3/2018 | Lemmers et al. |
| 10,071,811 | B2 | 9/2018 | Kupiszewski et al. |
| 10,240,522 | B2 | 3/2019 | Jones et al. |
| 10,308,366 | B2 | 6/2019 | Kupiszewski et al. |
| 10,422,282 | B2 | 9/2019 | Williams |
| 11,578,657 | B2 | 2/2023 | Muldoon et al. |
| 2004/0060278 | A1 | 4/2004 | Dionne |
| 2007/0157597 | A1 | 7/2007 | Sharp |
| 2009/0196736 | A1* | 8/2009 | Sengar ............... F02C 6/08 |
| | | | 415/115 |
| 2015/0288253 | A1 | 10/2015 | Wilson et al. |
| 2016/0376908 | A1 | 12/2016 | Reed et al. |
| 2017/0284298 | A1 | 10/2017 | Suciu et al. |
| 2017/0334377 | A1 | 11/2017 | Klemen et al. |
| 2018/0016933 | A1* | 1/2018 | Elbibary ............... F01D 21/00 |
| 2019/0101057 | A1 | 4/2019 | Stevenson et al. |
| 2019/0218998 | A1 | 7/2019 | Menheere et al. |
| 2019/0316486 | A1* | 10/2019 | Roberge ............... F02C 7/18 |
| 2019/0353103 | A1 | 11/2019 | Roberge |
| 2021/0239046 | A1* | 8/2021 | Muldoon ............... F02C 7/16 |
| 2022/0082052 | A1* | 3/2022 | Muldoon ............... F02K 1/04 |

FOREIGN PATENT DOCUMENTS

| | | |
|---|---|---|
| CN | 110857663 A | 3/2020 |
| CN | 111232223 A | 6/2020 |
| DE | 19630792 A1 | 10/1997 |
| DE | 19718387 A1 | 11/1997 |
| DE | 102014211590 A1 | 12/2015 |
| EP | 1921310 A1 | 5/2008 |
| EP | 3088703 A1 | 11/2016 |
| WO | 2011082939 A2 | 7/2011 |

OTHER PUBLICATIONS

Chinese Office Action for Application No. 202110949892.X dated May 18, 2024 (27 pages with English Translation).
Polish Search Report for PL Application No. P-435035 dated Apr. 21, 2021 (13 pages with English Translation).

* cited by examiner

GAS TURBINE ENGINES INCLUDING EMBEDDED ELECTRICAL MACHINES AND ASSOCIATED COOLING SYSTEMS

CROSS REFERENCE TO RELATED APPLICATION

The present application is a divisional of U.S. application Ser. No. 17/400,936 filed Aug. 12, 2021, which claims the priority benefit of Polish Patent Application No. P-435035, entitled "Gas Turbine Engines Including Embedded Electrical Machines And Associated Cooling Systems" and filed Aug. 20, 2020, the entire contents of which is hereby incorporated by reference herein.

BACKGROUND

Field

The present specification generally relates to gas turbine engines and, more specifically, to gas turbine engines that include embedded electrical machines and associated cooling systems for cooling the electrical machines.

Technical Background

Gas turbine engines are frequently used as part of aircraft propulsion systems. Gas turbine engines may include a compressor section, a combustion section, a turbine section and an exhaust section. Air is provided by a fan to the compressor section where the air is compressed and delivered to the combustion section. In the combustion section, the air is mixed with fuel and then burned. The combustion gases are then delivered to the turbine section, which drives the turbine section before delivering the combustion gases to the exhaust section.

During operation, temperatures within the gas turbine engines may be elevated. In order to manage the increases in temperature of the gas turbine engines, various cooling systems may be provided that are used to remove thermal energy from various components of the gas turbine engines. Certain components of the gas turbine engines may be more adept at handling increases in temperatures than other components. It may be desirable, for example, to limit temperature increases of electrical machines that may be embedded within the gas turbine engines.

SUMMARY

According to an embodiment of the present disclosure, a gas turbine engine includes a fan located at a forward portion of the gas turbine engine. A compressor section and a turbine section are arranged in serial flow order. The compressor section and the turbine section together define a core airflow path. A rotary member is rotatable with at least a portion of the compressor section and with at least a portion of the turbine section. An electrical machine is coupled to the rotary member and is located at least partially inward of the core airflow path in a radial direction. An enclosure at least partially encloses the electrical machine. The enclosure at least partially defines a first cooling airflow path within the enclosure that at least partially defines a first cooling airflow buffer cavity at least partially around the electrical machine. The first cooling airflow path is in communication with a second cooling airflow path located outside the enclosure that at least partially defines a second cooling airflow buffer cavity at least partially around the enclosure. A cooling duct provides pressurized air to the first cooling airflow path such that the air flows along both the first cooling airflow path and the second cooling airflow path providing the first cooling airflow buffer cavity and the second cooling airflow buffer cavity.

According to another embodiment of the present disclosure, a gas turbine engine includes a fan located at a forward portion of the gas turbine engine. A compressor section and a turbine section are arranged in serial flow order. The compressor section and the turbine section together defining a core airflow path. A rotary member is rotatable with at least a portion of the compressor section and with at least a portion of the turbine section. An electrical machine is coupled to the rotary member and located at least partially inward of the core airflow path in a radial direction. An enclosure at least partially encloses the electrical machine. The enclosure at least partially defines a cooling airflow path within the enclosure. A cooling duct is in communication with a cooling blower assembly located in an undercowl space. The cooling duct is in communication with the cooling airflow path such that air flows along the cooling airflow path.

According to another embodiment of the present disclosure, a method of using a gas turbine engine is provided. The gas turbine engine includes a fan located at a forward portion of the gas turbine engine. A compressor section and a turbine section are arranged in serial flow order. The compressor section and the turbine section together define a core airflow path. A rotary member is rotatable with at least a portion of the compressor section and with at least a portion of the turbine section. An electrical machine is coupled to the rotary member and located at least partially inward of the core airflow path in a radial direction. When the gas turbine engine is shut down, a cooling blower assembly located internal to the gas turbine engine is used to control a temperature of the electrical machine.

According to another embodiment, a method of using an engine is provided. The method includes the engine comprising a core cowl, an undercowl space, and a compressor in fluid communication with a downstream combustor and turbine. The engine is operated and shut down. After or during engine shutdown, a blower disposed in the undercowl space is operated and forced air produced by the blower passes through at least one cooling duct. The cooling duct includes an end located adjacent to an electrical machine to provide cooling air generated by the blower to the electrical machine.

Additional features, embodiments and advantages of the gas turbine engines and methods of their use described herein will be set forth in the detailed description which follows, and in part will be readily apparent to those skilled in the art that such features, embodiments and advantages are contemplated and considered within the scope of the disclosure, based on the teachings disclosed hereupon.

It is to be understood that both the foregoing general description and the following detailed description describe various embodiments and are intended to provide an overview or framework for understanding the nature and character of the subject matter described and claimed herein. The accompanying drawings are included to provide a further understanding of the various embodiments, and are incorporated into and constitute a part of this specification. The drawings illustrate the various embodiments described herein, and together with the description serve to explain the principles and operations of the subject matter described and claimed herein.

DETAILED DESCRIPTION

Embodiments described herein are generally directed to gas turbine engines that include embedded electrical machines and associated cooling systems for cooling the electrical machines. The gas turbine engines may include a compressor section and a turbine section arranged in serial flow order and together defining a core airflow path. A rotary member, such as a shaft, spool, etc., is rotatable with at least portions of the compressor section and turbine section. The electrical machine is embedded within the gas turbine engines. The electrical machine may be rotatable with the rotary member and positioned coaxially with the rotary member at least partially inward of the core airflow path along a radial direction of the gas turbine engines. The electrical machine may be an electric generator that is driven by the rotary member.

The gas turbine engines include a cooling system that cools the electrical machine, which may be needed due to the rearward location of the electrical machine in the gas turbine engines. In particular, the electrical machine may be located at least partially inward of the core airflow path in the radial direction. An enclosure may be provided that at least partially encloses the electrical machine. The enclosure may at least partially define a first cooling airflow path within the enclosure that at least partially defines a first cooling airflow buffer cavity at least partially around the electrical machine. The first cooling airflow path may be in communication with a second cooling airflow path located outside the enclosure that at least partially defines a second cooling airflow buffer cavity at least partially around the enclosure. These multiple cooling airflow buffer cavities can provide multiple insulator layers, one radially inside the other, that can insulate the electrical machine from hot operating temperatures within the core airflow path during operation. The cooling system may further include a cooling duct that is in communication with a cooling blower assembly. The cooling blower assembly may be located in an undercowl space within the gas turbine engines. The cooling duct may direct cooling air along the first and second cooling airflow paths such that the air flows along the first and second cooling airflow paths, during or after engine shutdown.

Figure 1:
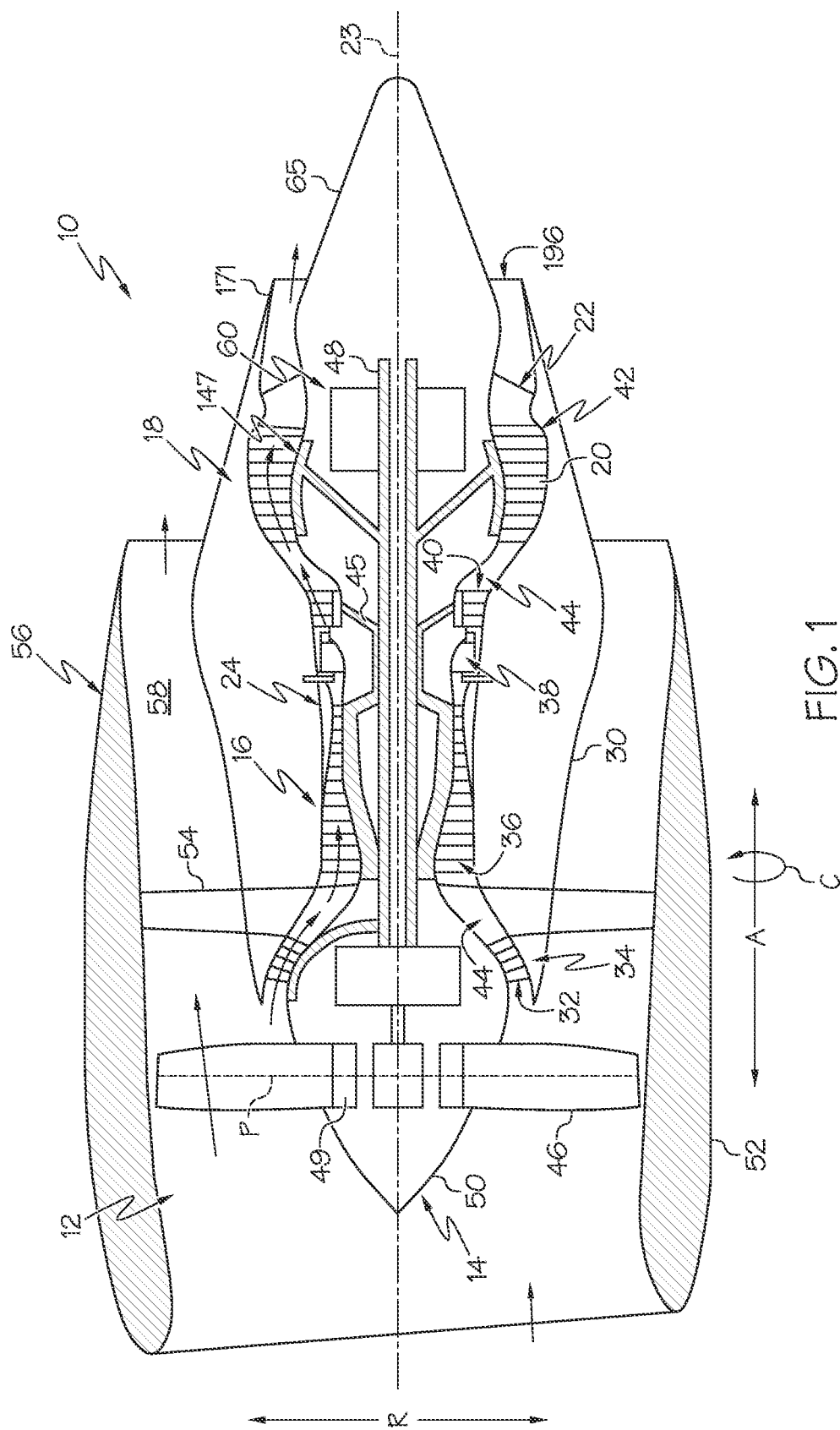
FIG. 1 is a diagrammatic section view of a gas turbine engine including an electrical machine, according to one or more embodiments shown and described herein.

Referring to FIG. 1, an exemplary gas turbine engine 10 may be configured for wing or fuselage mounting on an aircraft. In some embodiments, the gas turbine engine 10 may also be used to provide power. The gas turbine engine 10 includes a fan section 12 including a fan 14, a compressor section 16 and a turbine section 18. The fan section 12, compressor section 16 and turbine section 18 may include one or more rotor disks 20 that include rotor blades extending radially therefrom. Air is drawn into the gas turbine engine 10 and accelerated by the fan 14. The air, or at least a portion thereof, is compressed in the compressor section 16 and is delivered to a combustion chamber where the air is mixed with fuel and combusted thereby generating hot combustion gas. The combustion gases pass through a turbine section 18, which extracts mechanical work from the combustion gases to cause the attached compressor section 16 to turn and thereby further compress the upstream air to produce a self-sustaining process. The combustion gas is exhausted through a nozzle section 22.

The gas turbine engine 10 defines an axial direction A that extends parallel to a longitudinal centerline 23, a radial direction R that extends perpendicular to the axial direction A, and a circumferential direction C that extends about the axial direction A. The gas turbine engine 10 includes the fan section 12 and a core section 24 that is located downstream of the fan section 12 in the axial direction.

The gas turbine engine 10 includes a tubular core cowl 30 that defines, at least in part, an annular inlet 32. The core cowl 30 encases, in serial flow relationship, the compressor section 16 including a booster or low pressure (LP) compressor 34 and a high pressure (HP) compressor 36; a combustion section 38 that includes the combustion chamber; the turbine section 18 including a high pressure (HP) turbine 40 and a low pressure (LP) turbine 42; and the jet exhaust nozzle section 22. The compressor section 16, combustion section 38, and turbine section 18 together define a core airflow path 44 extending from the annular inlet 32 through the LP compressor 34, HP compressor 36, combustion section 38, and HP turbine 40. A first shaft or spool 45 drivingly connects the HP turbine 40 to the HP compressor 36. A second shaft or spool 48 drivingly connects the LP turbine 42 to the LP compressor 34 and the fan 14.

The fan section 12 includes the fan 14 having a plurality of fan blades 46 coupled to a disk 49 in a spaced apart manner. The fan blades 46 extend outwardly from disk 49 generally along the radial direction R. The disk 49 is covered by rotatable front hub 50 that is aerodynamically contoured to promote an air flow through the plurality of fan blades 46. The exemplary fan section 12 includes an annular fan casing or outer nacelle 52 that circumferentially surrounds the fan 14 and/or at least a portion of the core section 24. The outer nacelle 52 is supported relative to the core section 24 by a plurality of circumferentially-spaced struts that also serve as outlet guide vanes 54. A downstream section 56 of the outer nacelle 52 extends over an outer portion of the nacelle to define a bypass airflow passage 58 therebetween.

The gas turbine engine 10 includes an electrical machine 60 that is rotatable with the fan 14 and is located within a tail cone 65. The electrical machine 60 is an electric generator co-axially mounted to and rotatable with the second shaft 48. In other embodiments, an axis of the electrical machine 60 may be offset radially from the axis of the second shaft 48 and further may be oblique to the axis of the second shaft 48, such that the electrical machine 60 may be positioned at any suitable location at least partially inward of the core airflow path 44. In some embodiments, the electrical machine 60 may be rotatable with the first shaft 45.

The gas turbine engine 10 depicted in FIG. 1 is provided by way of example only. In other exemplary embodiments the gas turbine engine 10 may be replaced with other types of gas turbine engines utilizing an embedded electrical machine without loss of clarity. Examples include a turboprop engine, a turbojet engine, an open rotor, or inducted fan engine.

Figure 2:
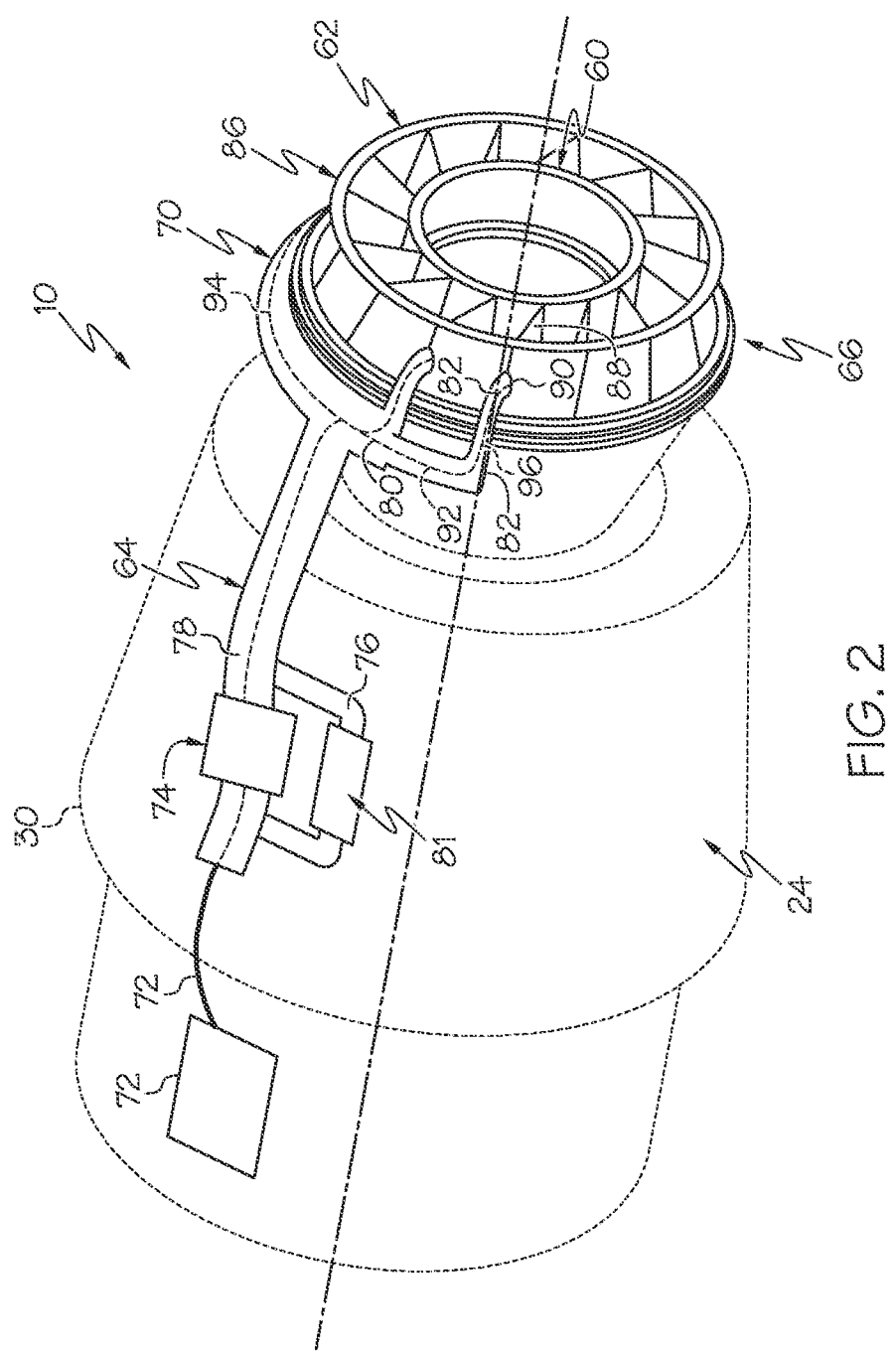
FIG. 2 is a diagrammatic perspective view of a portion of the gas turbine engine of FIG. 1 including a location for the electrical machine and both an electrical system and a cooling system for cooling the electrical system and electrical machine, according to one or more embodiments shown and described herein.

Referring to FIG. 2, a perspective view of a portion of the gas turbine engine 10 is illustrated diagrammatically and generally describes an electrical system 62 and a cooling system 64. The electrical system 62 includes the electrical machine 60 disposed in an aft portion 66 of the gas turbine engine 10. The aft portion 66 is disposed axially downstream the core section 24 of the gas turbine engine 10. The electrical machine 60 converts mechanical energy (e.g., generated from exhaust gases generated in the core section 24) produced by the gas turbine engine 10 into electrical energy that may be used to power electrical devices of the gas turbine engine 10 or components disposed elsewhere on an aircraft incorporating the gas turbine engine 10. Positioning the electrical machine 60 in the aft portion 66 of the gas turbine engine 10 can render the electrical machine 60 accessible for maintenance, repair, and replacement. The electrical machine 60 may be integrated into the gas turbine engine 10 via a set of connections that may be removed without invasively disassembling the entirety of the gas turbine engine 10, such as without removing the gas turbine engine 10 from a wing of an aircraft.

Positioning the electrical machine 60 in the aft portion 66 provides accessibility, but can create additional design considerations for the gas turbine engine 10. Exhaust gases generated via the core section 24 can be at relatively high temperatures (e.g., in excess of approximately 700° C. or more in various embodiments), which renders cooling the electrical machine 60 beneficial. Additionally, the aft portion 66 of the gas turbine engine 10 may not be directly connected to an aircraft incorporating the gas turbine engine 10 (e.g., the gas turbine engine 10 may be connected to a wing of an aircraft via a pylon extending from the outer nacelle 52 (FIG. 1) disposed radially outward from the core section 24). Given this, to provide the electrical power generated via the electrical machine 60 to other portions of the aircraft, the electrical power is routed through the gas turbine engine 10.

In view of the foregoing, the electrical system 62 includes a connection assembly 70 that is routed through the cooling system 64. The connection assembly 70 includes a plurality of electrical connectors 73 (e.g., power cables) that conductively connect the electrical machine 60 to a converter 72. For example, the electrical machine 60 may generate an alternating current ("AC") power signal from mechanical energy in the spinning LP shaft 48, which electrical power is routed to the converter 72 (located in the forward part of the engine) via the connection assembly 70. The converter 72 may generate a DC voltage from the AC power signal for communication to alternative locations on the aircraft (e.g., via an electrical communications bus). The structure of the converter 72 and connection assembly 70 may vary depending, at least in part, on the structure and capabilities of the electrical machine 60. For example, in various embodiments, the electrical machine 60 may generate an AC power signal having any number of phases (e.g., one phase, two phases, three phases, four phases, etc.). The connection assembly 70 may include a plurality of sets of electrical connectors, with each set of electrical connectors including a number of electrical connectors that correspond to the number of phases in the AC power signal generated via the electrical machine 60. The number of sets of electrical connectors of the connection assembly 70 may vary depending on the implementation. Incorporating a number of different sets of electrical connectors in the connection assembly 70 can provide electrical connection redundancies that facilitate provision of the AC power signal to the converter 72 even if one of the sets of the electrical connectors fails during operation.

The cooling system 64 routes cooling air from an air source to the electrical machine 60 to maintain the electrical machine 60 in a desired temperature range despite the electrical machine 60 being disposed proximate to relatively high temperature exhaust generated via the core section 24. The cooling system 64 may include a valve assembly 74 in fluid communication with the air source (see also FIG. 6A). In embodiments, the valve assembly 74 may be controlled by a controller (e.g., FADEC controlled) or it may be initiated for a pre-set period of time during or after engine shutdown. The blower may alternatively be operated for a period of time, based on a temperature sensor in proximity to the electrical machine or elsewhere within the core cowl. Upon initiating the blower (during or after shutdown) the valve assembly 74 is opened and cooling air drawn into the cooling system 64. The cooling system 64 may further include a bypass duct 76 that can be used to bypass the valve assembly 74. A cooling blower assembly 81 may be controlled via the controller to operate during time periods when the valve assembly 74 is closed. Cooling air may be provided to the electrical machine 60 using the bypass duct 76 and the cooling blower assembly 81 irrespective of a state of operation of the gas turbine engine 10. The cooling blower assembly 81 may be powered by an aircraft or another power source dedicated for use by the cooling blower assembly 81.

The cooling system 64 may include a plurality of different ducts having structures extending in different directions at various positions within the gas turbine engine 10. As depicted, the cooling system 64 includes a main duct 78, a circumferential duct 80, and a plurality of generator cooling ducts 82. The main duct 78, the circumferential duct 80, and the plurality of generator cooling ducts 82 may be designed to provide adequate space for routing the connection assembly 70 to the electrical machine 60 while reducing impacts on aerodynamic performance of the gas turbine engine 10.

The valve assembly 74 controls airflow through the main duct 78. The main duct 78 directs the cooling air towards the aft portion 66 where the electrical machine 60 is located. The circumferential duct 80 divides the cooling air into circumferential portions and directs the cooling air in a circumferential direction around the core cowl 30 of a turbine rear frame 86. In embodiments, the plurality of generator cooling ducts 82 divide each circumferential portion of the cooling air into cooling portions that are provided to the electrical machine 60 via struts 88 of the turbine rear frame 86. In some embodiments, the cooling system 64 includes four generator cooling ducts 82 that provide cooling air to the electrical machine 60 via four separate struts 88 of the turbine rear frame 86. It should be noted that any suitable existing structures of the gas turbine engine 10 may be made into cooling ducts configured to direct cooling air to a desired location. In embodiments, the generator cooling ducts 82 extend through the struts 88 into a generator coupler in fluid communication with the electrical machine 60 to cool the electrical machine 60. Each of the generator cooling ducts 82 may attach to one of outer ends 90 of the struts 88 to provide cooling air into an internal cavity defined by the strut 88 to which that generator duct 82 is attached.

The electrical connectors 73 of the connection assembly 70 extend through the main duct 78, the circumferential duct 80, the plurality of generator cooling ducts 82 and the struts 88 of the turbine rear frame 86 to conductively connect the converter 72 to the electrical machine 60. In embodiments, various sets of electrical connectors of the electrical connection assembly 70 extend through different combinations of ducts of the cooling system 64 to connect different portions (e.g., terminations) of the electrical machine 60 to the converter 72. For example, a first subset of electrical connectors 92 may be directed through a first portion of the circumferential duct 80 and a second subset of electrical connectors 94 may be directed through a second portion of the circumferential duct 80. The first and second subsets of electrical connectors 92 and 94 may be further divided such that baseline sets of electrical connectors 96 are routed through each generator duct 82, through one of the struts 88, and into the generator coupler for electrical connection to the electrical machine 60.

Figure 3:
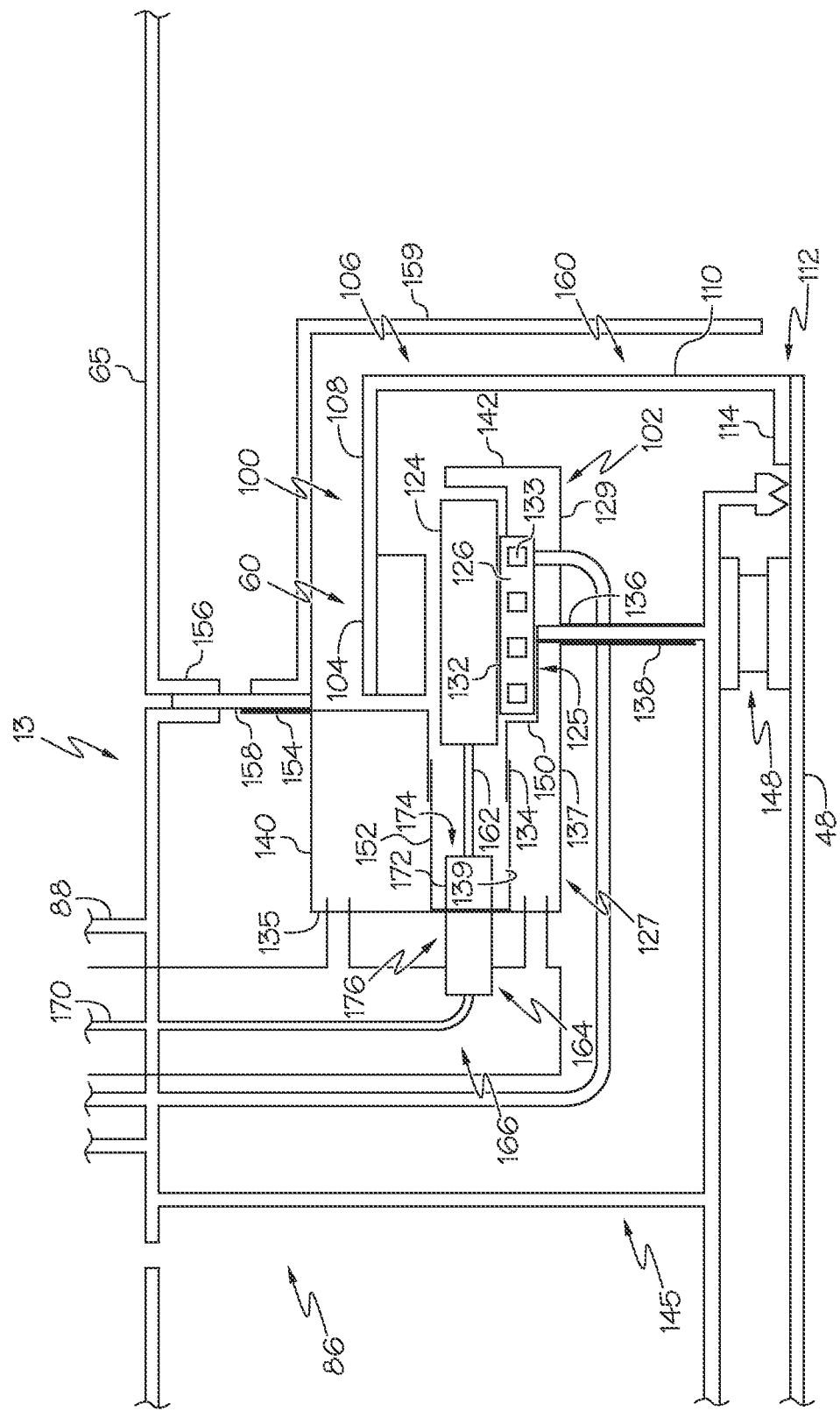
FIG. 3 is a diagrammatic section view of an aft portion of the gas turbine engine of FIG. 1 including the electrical machine, according to one or more embodiments shown and described herein.

Referring to FIG. 3, the electrical machine 60 embedded within the turbine section 18 of the gas turbine engine 10, and in particular the tail cone 65, is shown. The electrical machine 60 is attached to the second shaft 48 by a generator rotor subassembly 100. The electrical machine 60 includes the generator rotor subassembly 100 and a generator stator subassembly 102. The generator rotor subassembly 100 includes a generator rotor 104 that is fixedly connected to a rotor support member 106 of the generator rotor subassembly 100. The rotor support member 106 includes an outer support portion 108 that is connected directly to the generator rotor 104 and an inner support portion 110 that is connected to the second shaft 48 using a connector 112 and is indirectly connected to the generator rotor 104 via the outer support portion 108. The outer support portion 108 and the inner support portion 110 meet at a junction 113 forming an angle between the outer support portion 108 and the inner support portion 110 of equal to or less than 180 degrees. The connector 112 includes an axial portion 114 that connects directly to the second shaft 48 and a radial portion 116 that extends radially from the axial portion 114 and is connected to or part of the inner support portion 110 of the rotor support member 106.

Figure 4:
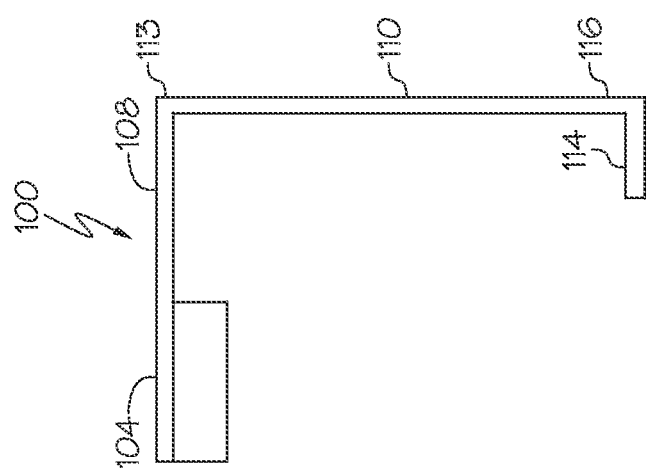
FIG. 4 is a diagrammatic side view of a generator rotor subassembly of the electrical machine of FIG. 3, according to one or more embodiments shown and described herein.

The connector 112 may be removably mounted to the second shaft 48. Referring briefly to FIG. 4, the generator rotor assembly 100 can be removed from the second shaft 48 by simply removing the tail cone 65 and releasing the generator rotor subassembly 100 rearward in the axial direction. Accessing and removal of the electrical machine 60 can even be accomplished without removing the gas turbine engine 10 from an airplane.

Figure 5:
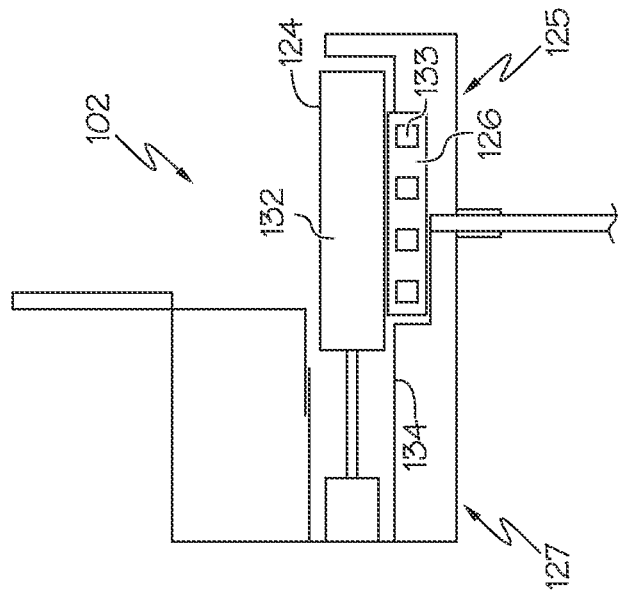
FIG. 5 is a diagrammatic side view of a generator stator subassembly of the electrical machine of FIG. 3, according to one or more embodiments shown and described herein.

Referring back to FIG. 3, the generator stator subassembly 102 includes a generator stator 124 that is fixedly connected to a connection manifold 125 that includes a stator support member 126 and a cooling manifold 127 that is connected to the connection manifold 125. The cooling manifold 127 is connected to the connection manifold 125 forming an L-shape support structure in cross-section for supporting the generator stator 124 (FIG. 5) about the second shaft 48. The stator support member 126 includes an axial support member 132 on which the generator stator 124 sits that includes a plurality of coolant cavities 133 that can receive a coolant liquid, such as an oil, from a liquid coolant source to control temperature of the generator stator 124 during operation. The axial support member 132 is connected to an intermediate support member 134 of the connection manifold 125 at a mounting tab 136 that is connected to a mounting flange 138. Intermediate support member 139 of the cooling manifold 127 is connected to the intermediate support member 134 of the connection manifold 125. The intermediate support member 134 extends axially from a radial support member 135 that forms an end of the cooling manifold 127. The radial support member 135 extends radially between an inner support member 137 and an outer support member 140 of the cooling manifold 127.

The stator support member 126 of the connection manifold 125 includes a stator connection structure 129 that extends axially from the mounting flange 138 to a clip member 142 that is used to clip about an aft-facing portion of the generator stator 124. The mounting tab 136 may be used to connect the generator stator subassembly 102 to the mounting flange 138 that connects to support structure 145, which is part of the turbine rear frame 86. The mounting tab 136 may also include or form a clip member 150 that is used to clip about a forward-facing portion of the generator stator 124. A bearing assembly 148 may be provided that allows the second shaft 48 to rotate relative to the support structure 145 and the generator stator subassembly 102 while providing radial support for the support structure 145 and the tail cone 65.

The cooling manifold 127 further includes the outer support member 140 and another intermediate support member 152. The outer support member 140 and intermediate support member 152 are both connected to a generator coupler 158 using a fastener 154 (e.g., a bolt), which is also connected to the tail cone 65 by another fastener 156. A thermal shield 159 defines an enclosure 160 that extends from the generator coupler 158 and the cooling manifold 127 both axially and radially about the electrical machine 60. The thermal shield 159 may be formed of any suitable material, such as ceramic, aluminum, steel, etc. As used herein, a "thermal shield" refers to a structure that is effective in reducing one or more of convective, conductive and radiative heat transfer to the electrical machine.

The generator rotor 104 and the generator stator 124 operate together to generate power as the second shaft 48 rotates during engine operation. In some embodiments, the generator rotor 104 includes a plurality of permanent magnets circumferentially distributed about the generator stator 124 such that rotation of the generator rotor 104 about the generator stator 124 generates an AC power signal. The generator stator 124 may include a plurality of windings conductively connected via a conductor 162 to an electrical connector 164. The electrical connector 164 may be supported by the cooling manifold 127 to connect with a generator coupler 166.

The electrical connector 164 is an electrical coupler that is configured to provide a conductive connection between the electrical connector 164 electrically coupled to the generator stator 124 and electrical lines 170. The electrical lines 170 may be, for example, routed through one of the struts 88 of the turbine rear frame 86. The electrical connector 164 may have a first portion 172 that is located in a connection cavity 174 provided by the cooling manifold 127 and a second portion 176 that extends between the cooling manifold 127 and the generator coupler 166. As will be described below, the generator coupler 166 can be used to route cooling air into and through the enclosure 160 for removing heat from the electrical machine 60.

Referring briefly to FIG. 1, a process of removing the electrical machine 60 from the gas turbine engine 10 may include a step of opening the core cowl 30 via a hinged portion of thereof to facilitate access to the turbine rear frame 86. An aft skin, represented by element 171, may then be removed via a bolted connection with the core cowl 30. The tail cone 65 may then be removed via a bolted connection to render the electrical machine 60 accessible.

Referring again to FIG. 3, after removal of the tail cone 65, the thermal shield 159 may then be removed by removing the fasteners 154, which also decouples outward ends of the cooling manifold 127 and the connection manifold 125 from the turbine rear frame 86. After removal of the enclosure 160, the rotor support member 106 may then be disengaged from the second shaft 48 to allow the entire generator rotor subassembly 100 to be removed from the second shaft 48 to provide access to the generator stator subassembly 102. A fastener may then be removed that couples the mounting flange 138 to mounting tab 136, enabling the entire generator stator subassembly 102 (including the cooling manifold 127 and the connection manifold 125) to be removed from the gas turbine engine 10 in the aft direction (e.g., after oil lines supplying oil to the electrical machine 60 from a lubrication system are removed). As such, removal of the electrical machine 60 from the gas turbine engine 10 may occur in a reduced number of steps without disturbing any mechanical couplings of other components of the gas turbine engine 10 other than the tail cone 65 and core cowl 30.

The manner with which the electrical machine 60 is positioned and connected within the gas turbine engine 10 facilitates access and removal of the electrical machine 60 without removing components of the gas turbine engine 10 that are disposed forward or radially-inward of the turbine rear frame 86. Accessing the electrical machine 60 in such a relatively non-invasive manner facilitates maintenance or replacement of various components of the electrical machine 60 while the gas turbine engine 10 is disposed on a wing of an aircraft, which reduces time that the aircraft may be out of commission if the electrical machine 60 needs repairs.

Furthermore, the manner with which the electrical machine 60 is connected to various components of the gas turbine engine 10 provides for a streamlined process for removal of the electrical machine 60 from the gas turbine engine 10.

Figure 6A:
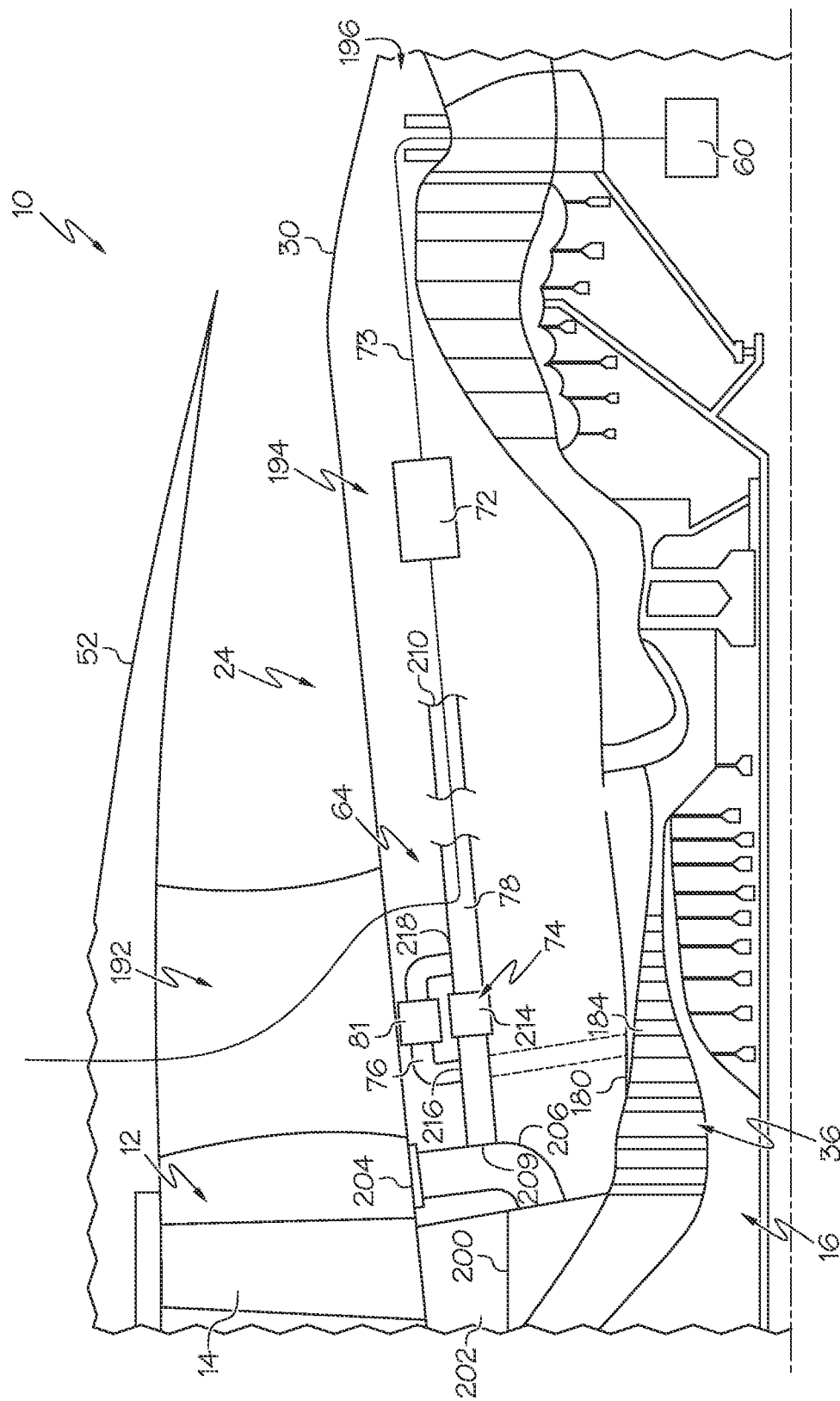
FIG. 6A is a diagrammatic section view of the gas turbine engine of FIG. 1 including a cooling system, according to one or more embodiments shown and described herein.

Referring to FIG. 6A, as discussed above, the gas turbine engine 10 includes the cooling system 64 that is used to remove heat from the electrical machine 60. The cooling system 64 includes the valve assembly 74 that controls the flow of cooling air from the air source, such as from the compressor section 16 and/or the fan section 12. In particular, FIG. 6A illustrates an embodiment of the core section 24 of the gas turbine engine 10 with the fan section 12 adjacent the core section 24. The HP compressor 36 includes a number of stages of rotating blades and stationary vanes all surrounded by compressor casing 180.

The gas turbine engine 10 may optionally incorporate a variable bleed valve ("VBV") system for controlling booster stall margin. The VBV system includes one or more variable bleed valves 200 mounted within a fan hub frame 202. The variable bleed valves 200 are open during low power operation of the gas turbine engine 10, such as at idle, for bleeding a portion of the compressed air. The variable bleed valves 200 may be closed at high power operation of the gas turbine engine 10, such as during cruise or takeoff, since bleeding may not be needed. When the variable bleed valves 200 are open, air is passed from a booster flow path through the fan hub frame 202 and into a bypass duct or more generally the bypass space external of the outer nacelle 52. In the illustrated example, the engine 10 includes at least one bypass duct 206 defining an airflow path from the fan hub frame 202 to a bleed vent 204 communicating with the bypass flow path 192. In some embodiments, the main duct 78 may be communicatively connected to the bypass duct 206 for receiving cooling air therefrom. In some embodiments, the main duct 78 may be connected to an upstream location of the compressor section 16 for receiving cooling air therefrom.

Figure 7:
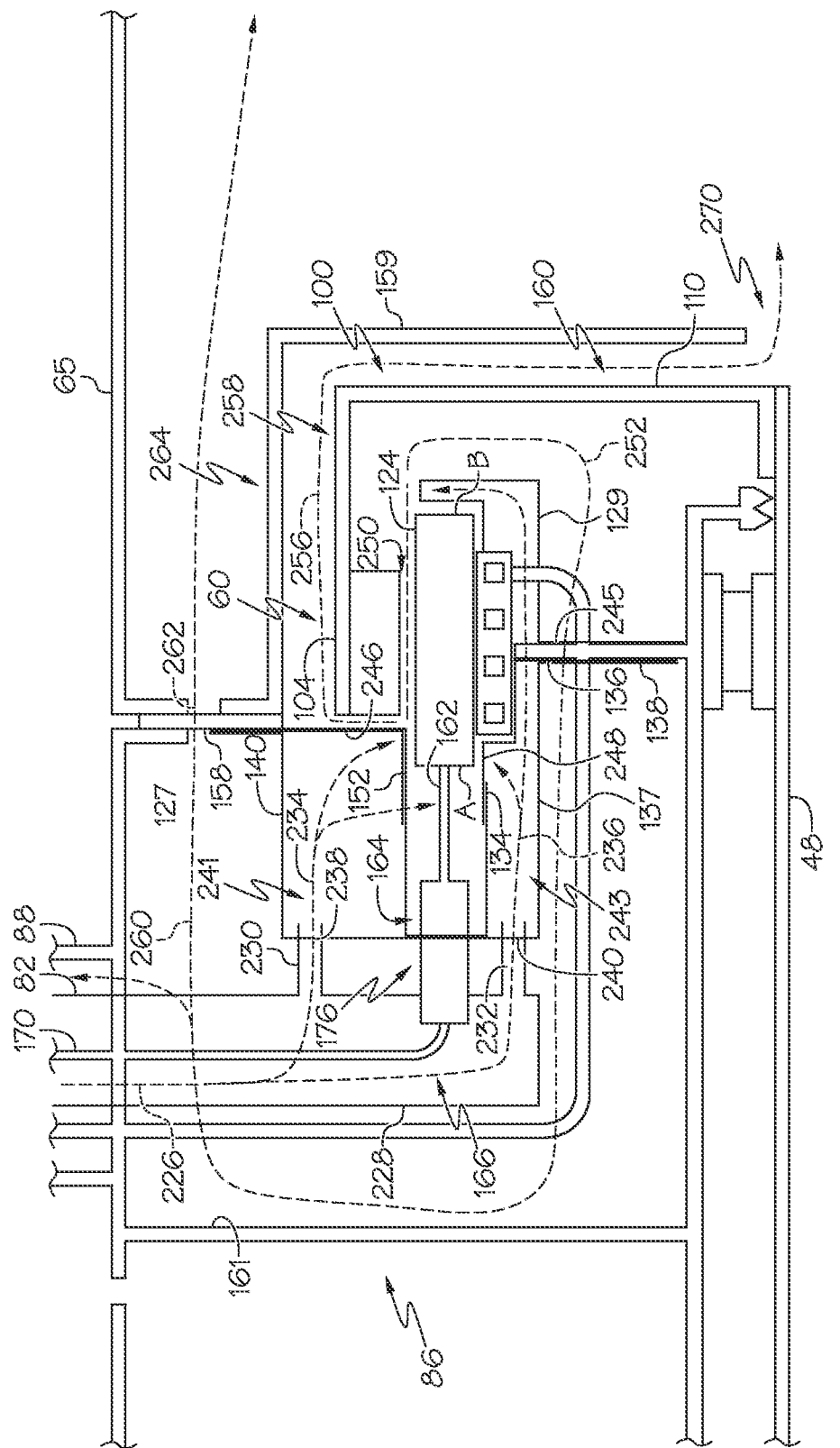
FIG. 7 is a diagrammatic section view of the aft portion and electrical machine of FIG. 3 in use, according to one or more embodiments shown and described herein.

The cooling system 64 includes the main duct 78 that may be communicatively connected to the bypass duct 206. The bypass duct 206 is provided to extract air away from the fan toward the bypass flow path 192. The extracted air may be used as the cooling air since the temperature of the cooling air is less than operating temperatures in the aft portion 66 without the cooling air. In particular, the cooling air can be used to cool the electrical machine 60 that is in the tail cone 65 (FIG. 7).

The engine core section 24 is surrounded by (contained within) the core cowl 30 which defines an inboard boundary of the bypass flow path 192 over which fan bypass air flows. Shown is a ducted turbofan, which includes the fan 14 or one of multiple fans surrounded by the outer nacelle 52 which is spaced-away from the core cowl 30 and defines an outboard boundary of the bypass flow path 192. In this example the bypass flow path 192 could also be referred to as a "fan duct." Alternatively, in the case of an open rotor engine, outer nacelle 52 would not be present and the bypass flow path 192 would be bounded only by an outer surface of the core cowl 30. The space inboard of the core cowl 30 is referred to as "undercowl space" 194. In practice, the undercowl space 194 may be vented to ambient external environment, for example through the vent 196 (shown schematically in FIG. 1). Things that are said to be internal to the engine, for purposes of this disclosure, means things that are located within the space surrounded by the outer nacelle 52, or the core cowl 30 (in a case such as an open rotor engine where the outer nacelle 52 is not present).

The main duct 78 may be located wholly or at least partially within the undercowl space 194. The main duct 78 has one or more inlets, represented by element 209, in fluid communication with the bypass duct 206. In some embodiments, the inlet 209 of the main duct 78 is connected directly to the bypass flow path 192 with or without being connected to the bypass duct 206. The main duct 78 further has an outlet, represented by element 210, that is in fluid communication with the circumferential duct 80 that is in fluid communication with the plurality of the generator cooling ducts 82 (FIG. 2).

The valve assembly 74 may be incorporated within the main duct 78 and includes one or more valves operable to control airflow through the main duct 78. As one example, the valve assembly 74 may include a valve 214 that may be a controllable valve that includes a flow control element movable between open and closed configurations. In the open configuration, airflow through the main duct 78 is permitted by the flow control element and, in the closed configuration, airflow through the main duct 78 is inhibited by the flow control element. In some embodiments, the valve 214 may have a variable intermediate configuration that allows for adjustment of the air flow to a selected airflow rate between predetermined minimum and maximum flowrates. As an example, the valve 214 may allow passage of up to about 100 percent of a total flow rate of cooling air from the bypass duct 206 through the main duct 78 during normal engine operation, such as up to about 70 percent, such as up to about 50 percent, such as up to about 25 percent, such as up to about 10 percent, such as between about 10 percent and about 90 percent, such as between about 30 percent and about 70 percent.

The bypass duct 76 may have an inlet 216 that is fluidly connected to the main duct 78 at a location that is upstream of the valve assembly 74. The bypass duct 76 may have an outlet 218 that is fluidly connected to the main duct 78 at a location that is downstream of the valve assembly 74. The inlet 216 and the outlet 218 of the bypass duct 76 may be on opposite sides of the valve assembly 74 such that cooling airflow can bypass the valve assembly 74 when the valve 214 is in the closed configuration.

The bypass duct 76 includes the cooling blower assembly 81 between inlet 216 and the outlet 218. The cooling blower assembly 81 may be any apparatus operable to blow, pump, or move a cooling airflow from the inlet 216 towards the outlet 218. A power source for operating the cooling blower assembly 81 may be mechanical, hydraulic, pneumatic, or electrical. For example, a blower rotor may be coupled to an electric motor. In one example, the motor may be an AC induction motor or DC motor. The motor may utilize a power source provided by an airplane, or may utilize its own power source, for example, internal to the cooling blower assembly. Further, the cooling blower assembly 81 may be sized to provide an adequate discharge pressure and flow rate for cooling of the electrical machine 60, which can depend, at least in part, on the size of the gas turbine engine. Also, the speed of the cooling blower assembly 81 may be controlled in order to change the air velocity automatically and/or in response to a user input. For example, the volumetric air flow rate provided by the cooling blower assembly 81 may be anywhere between about 8.5 m$^3$/min (300 cfm) to about 28.3 m$^3$/min (1000 cfm).

Figure 6B:
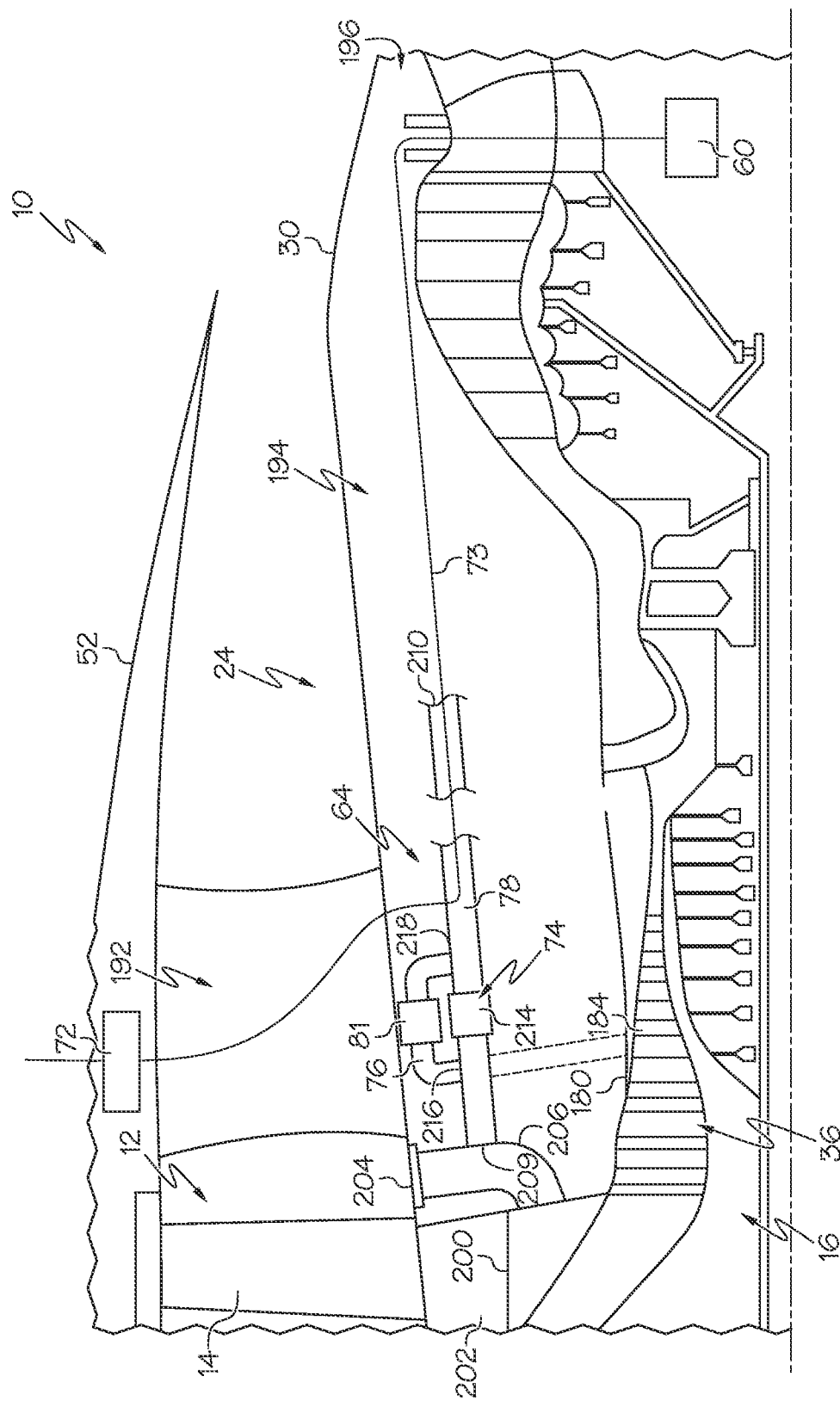
FIG. 6B is a diagrammatic section view of another embodiment of the gas turbine engine of FIG. 1, according to one or more embodiments shown and described herein.

When the gas turbine engine 10 is running, the valve assembly 74 is in the open configuration and the blower assembly 81 is inactive. The bypass duct 76 is pressurized with cooling air travelling from the bypass duct 206 and/or the bypass flow path 192. The cooling air travels by the valve assembly 74, into the circumferential duct 80 and then through the generator cooling ducts 82. FIG. 6A illustrates an embodiment with the converter 72 located in the bypass flow path 192. FIG. 6B illustrates another embodiment with the converter 192 located in the nacelle 52.

FIG. 7 illustrates the cooling air 226 flowing through the one of the struts 88 and alongside the electrical lines 170. The cooling air 226 can remove heat from the electrical lines 170 and then flows into a housing 228, which may also be a housing of the generator coupler 166. In some embodiments, the housing 228 and strut 88 form at least part of the generator cooling duct 82. In some embodiments, the cooling duct 82 is located within the strut 88. The cooling air 226 flows out of the strut 88 through a pair of cooling air outlets 230 and 232. The cooling outlets 230 and 232 may be continuous about the second shaft 48 in the circumferential direction or may comprise multiple outlets that are spaced-apart in the circumferential direction about the second shaft 48. The cooling air outlets 230 and 232 may be spaced-apart in the radial direction, with the cooling air outlet 230 located nearer to the outer support member 140 than the cooling air outlet 232 and the cooling air outlet 232 located nearer to the inner support member 137 than the cooling air outlet 230. It should be noted that FIG. 7 represents only a section view through only a radial portion of the tail cone 65 for simplicity and there may be multiple sets of openings and air flows about the circumference of the tail cone 65.

The cooling air outlets 230 and 232 may be sized and arranged to provide two separate inflow air paths 234 and 236 that lead toward the electrical machine 60. The radial support member 135 may include openings, represented by elements 238 and 240, that allow the cooling air to flow into of the cooling manifold 127. The support members 134, 137, 140 and 152 form the cooling channels 241 and 243 and can direct the cooling air into the connection manifold 125 and into the enclosure 160. The cooling channels 241 and 243 can extend circumferentially continuously or intermittently about the second shaft 48. Some cooling airflow 233 may be directed toward the conductor 162 and the electrical connector 164.

The size and shape of the cooling channels 241 and 243 along with speed of the cooling blower assembly 81 as well as the position and setting of the valve assembly 74 can be used to provide a preselected percentage of total air flow through each of the cooling channels 241 and 243. For example, a percent of total air flow (i.e., the flow through the main duct 78) traveling along the inflow air path 234 may be different than the percent of total flow traveling along the inflow air path 236. In other examples, the percent air flow travelling along the inflow air paths 234 and 236 may be about the same.

The inflow air path 234 is provided between the outer support member 140 and the intermediate support member 152, through an opening, represented by element 246, and into the enclosure 160. The inflow air path 236 is provided between the inner support member 137 and the intermediate support member 134, through an opening, represented by element 248, and into the enclosure 160. The inflow airflow paths 234, 236 may have about the same or different cross-sectional area sizes. The inflow airflow paths 234 and 236 create air flow that impinge on a forward part of the end winding of the electrical machine 60 at location A (e.g., each between about 5 percent and about 50 percent, such as between about 5 percent and about 30 percent of the total air flow). The air flow of the airflow path 236 is divided between a first airflow 249 that impinges on end windings of the electrical machine 60 at location A (e.g., between about 5 percent and about 30 percent of the total air flow) and a second airflow 251 radially underneath the generator stator 124 to impinge on rear windings of the electrical machine 60 at location B (e.g., between about 30 percent and about 70 percent of the total air flow).

Once in the enclosure 160, the cooling air may also travel through a gap 250 between the generator rotor 104 and the generator stator 124, and remove heat from the electrical machine 60, in particular from components of the generator rotor subassembly 100, such as the magnets. The inner support portion 110 of the rotor support member 106 may direct the used cooling air forward along an inner cooling airflow path 252 around the generator stator 124 and the stator connection structure 129. The thermal shield 159 may also direct the used cooling air rearward around the generator rotor 104. As used herein, the term "used cooling air" refers to cooling air that has removed heat from the electrical machine. The used cooling air, even having removed heat from the electrical machine, may still be of a sufficiently low temperature to provide a thermal buffer between the electrical machine 60 and the exhaust gas.

To this end, the generator rotor subassembly 100 and the thermal shield 159 of the enclosure 160 may define a first cooling airflow path 256 within the enclosure 160 that flows rearward and that at least partially defines a first cooling airflow buffer cavity 258 at least partially around the electrical machine 60. The first cooling airflow path 256 may include between about 15 percent and about 65 percent of the total airflow. Further, the generator stator subassembly 102 and the rotor support member 106 of the turbine rear frame 86 defines a second cooling airflow path 260 outside the enclosure 160 that flows forward, then vertically along the turbine rear frame 86 and rearward through an opening, represented by element 262, through the generator coupler 158. One or more openings 245 through the flange and tab 136, 138 can control an amount of air flow along the second cooling airflow path 260. In some embodiments, the turbine rear frame 86 may include a thermal blanket, represented by element 161 that at least partially surrounds the enclosure 160. This thermal blanket 161 can further isolate the electrical machine 60 from temperatures within the turbine section. In some embodiments, the thermal blanket may also be provided on the tail cone 65. The second cooling airflow path 260 may include between about 35 percent and about 85 percent of the total airflow from the main duct 64. The second cooling airflow path 260 at least partially defines a second cooling airflow buffer cavity 264 at least partially around the enclosure 160. The first cooling airflow path 256 and the second cooling airflow path 260 may be in fluid communication with each other via the enclosure 160. The first cooling airflow path 256 may lead out of the enclosure 160 through an opening 270 in the thermal shield 159, while the second cooling airflow path 260 may travel down the core airflow path. Both paths 256 and 260 may meet and flow out of the tail cone 65.

Referring also to FIG. 6A, when the gas turbine engine 10 is shut down, the valve assembly 74 is placed in the closed configuration and the blower assembly 81 is activated. Upon shutdown, soakback may begin occurring which may elevate the temperature of the electrical machine 60. The "peak soakback temperature" refers to the maximum temperature of the electrical machine 60 after the gas turbine engine shuts down. In some embodiments, the peak soakback temperature may be maintained below about 200° C. The blower assembly 81 is used to pressurize the bypass duct 76 with cooling air using the bypass duct 206. The cooling air travels through the main duct 78, into the circumferential duct 80 and then through the generator cooling ducts 82 thereby forming the first and second cooling airflow buffer cavities 258 and 264, as described above during operation of the gas turbine engine 10.

The above-described jet turbine engines include cooling systems that help remove heat form the electrical machines (e.g., generator assemblies) and create multiple thermal barriers to reduce external heat load on the electrical machines. Any suitable air sources may be used for cooling such as from a compressor section and/or from a bypass duct of a turbofan. The cooling air may be delivered by a main duct that is located beneath the core cowl. A bypass duct may be connected at opposite ends to the main duct to allow the cooling air to bypass a valve assembly when the valve assembly is closed. A cooling blower assembly may be provided in the bypass duct that is powered by aircraft power such that cooling air can be delivered to the electrical machines even when the gas turbine engine is deactivated. Such a bypass arrangement can limit temperature increase of the electrical machines after engine shutdown.

As used herein, the singular forms "a," "an" and "the" include plural referents unless the context clearly dictates otherwise. Thus, for example, reference to "a" component includes aspects having two or more such components, unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. The term "about" may include any values within ten percent of a particular value, such as within five percent of a particular value, such as within two percent of a particular value, such as within one percent of a particular value.

Directional terms as used herein—for example up, down, right, left, front, back, top, bottom, upper, lower—are made only with reference to the figures as drawn and are not intended to imply absolute orientation unless otherwise expressly stated. The terms "axial" and "longitudinal" both refer to a direction that is parallel to a centerline the gas turbine engine, while "radial" refers to a direction perpendicular to the longitudinal direction. The terms "tangential" and "circumferential" refer to a direction mutually perpendicular to both the radial and longitudinal directions. The terms "forward" or "front" refer to a location upstream in airflow passing through or around a component during operation, and the terms "aft" or "rear" refer to a location downstream during operation. These directional terms are used merely for convenience in the description and also do not require a particular orientation of the structures described thereby.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

Further aspects are provided by the subject matter in the following clauses:

1. A gas turbine engine comprises: a fan located at a forward portion of the gas turbine engine; a compressor section and a turbine section arranged in serial flow order, the compressor section and the turbine section together defining a core airflow path; a rotary member rotatable with at least a portion of the compressor section and with at least a portion of the turbine section; an electrical machine coupled to the rotary member and located at least partially inward of the core airflow path in a radial direction; an enclosure that at least partially encloses the electrical machine, the enclosure at least partially defining a first cooling airflow path within the enclosure that at least partially defines a first cooling airflow buffer cavity at least partially around the electrical machine, the first cooling airflow path in communication with a second cooling airflow path located outside the enclosure that at least partially defines a second cooling airflow buffer cavity at least partially around the enclosure; and a cooling duct that provides pressurized air to the first cooling airflow path such that the air flows along both the first cooling airflow path and the second cooling airflow path providing the first cooling airflow buffer cavity and the second cooling airflow buffer cavity.

2. The gas turbine engine of any preceding clause, wherein the cooling duct is in communication with an air source comprising the fan or the compressor section or both the fan and the compressor section.

3. The gas turbine engine of any preceding clause, wherein the cooling duct is in communication with an air source comprising a cooling blower assembly that is located forward of the electrical machine.

4. The gas turbine engine of any preceding clause, comprising a tail cone, wherein the electrical machine is located in the tail cone.

5. The gas turbine engine of any preceding clause, wherein the enclosure is at least partially defined by a thermal shield that extends at least partially about the electrical machine.

6. The gas turbine engine of any preceding clause, wherein the electrical machine comprises: a generator rotor subassembly comprising a generator rotor and a rotor support member that is connected to the generator rotor, the rotor support member mounted to the rotary member such that the generator rotor rotates with the rotary member; and a generator stator subassembly comprising a generator stator that is connected to a manifold, the manifold connected to a support structure of a turbine rear frame.

7. The gas turbine engine of any preceding clause, wherein a thermal blanket covers a surface of the turbine rear frame or a tail cone or both the turbine rear frame and the tail cone, the electrical machine located in the tail cone.

8. The gas turbine engine of any preceding clause, wherein the first cooling airflow path is provided between the generator rotor subassembly and the thermal shield.

9. The gas turbine engine of any preceding clause, wherein the second cooling airflow path is provided between the thermal shield and a tail cone.

10. The gas turbine engine of any preceding clause, wherein the cooling duct is in communication with a main duct that is in communication with a fan bypass duct or the compressor section or both the fan bypass duct and the compressor section.

11. The gas turbine engine of any preceding clause further comprising a cooling air bypass duct having opposite ends in communication with the main duct, the cooling air bypass duct comprising a cooling blower assembly.

12. The gas turbine engine of any preceding clause further comprising a valve assembly connected to the main duct, the valve assembly having an open configuration that allows cooling airflow by the valve assembly through the main duct and a closed configuration that inhibits cooling airflow by the valve assembly through the main duct.

13. The gas turbine engine of any preceding clause, wherein the valve assembly comprises a valve located between the opposite ends of the cooling air bypass duct.

14. The gas turbine engine of any preceding clause, wherein the cooling blower assembly is located within an undercowl space.

15. A gas turbine engine comprises: a fan located at a forward portion of the gas turbine engine; a compressor section and a turbine section arranged in serial flow order, the compressor section and the turbine section together defining a core airflow path; a rotary member rotatable with at least a portion of the compressor section and with at least a portion of the turbine section; an electrical machine coupled to the rotary member and located at least partially inward of the core airflow path in a radial direction; an enclosure that at least partially encloses the electrical machine, the enclosure at least partially defining a cooling airflow path within the enclosure; and a cooling duct that is in communication with a cooling blower assembly located in an undercowl space, the cooling duct in communication with the cooling airflow path such that air flows along the cooling airflow path.

16. The gas turbine engine of any preceding clause, wherein the cooling blower assembly receives power from an aircraft or a power source dedicated for the cooling blower assembly.

17. The gas turbine engine of any preceding clause, wherein the cooling duct is in communication with a main duct that receives air from the cooling blower assembly, the main duct in communication with a fan bypass duct or the compressor section or both the fan bypass duct and the compressor section.

18. The gas turbine engine of any preceding clause further comprising a cooling air bypass duct having opposite ends in communication with the main duct, the bypass duct comprising a cooling blower assembly.

19. The gas turbine engine of any preceding clause further comprising a valve assembly connected to the main duct having an open configuration that allows cooling airflow by the valve assembly through the main duct and a closed configuration that inhibits cooling airflow by the valve assembly through the main duct.

20. The gas turbine engine of any preceding clause, wherein the valve assembly comprises a valve that is located between the opposite ends of the bypass duct.

21. The gas turbine engine of any preceding clause further comprising one or more controllers that close the valve and activate the cooling blower assembly upon deactivation of the gas turbine engine such that airflows through the bypass duct.

22. The gas turbine engine of any preceding clause, wherein the cooling duct provides air to multiple outlets that provide multiple cooling airflow paths within the enclosure.

23. A method comprising: using a gas turbine engine comprising: a fan located at a forward portion of the gas turbine engine; a compressor section and a turbine section arranged in serial flow order, the compressor section and the turbine section together defining a core airflow path; a rotary member rotatable with at least a portion of the compressor section and with at least a portion of the turbine section; an electrical machine coupled to the rotary member and located at least partially inward of the core airflow path in a radial direction; and when the gas turbine engine is shut down, using a cooling blower assembly located internal to the gas turbine engine to control a temperature of the electrical machine.

24. The method of any preceding clause further comprising maintaining a peak soakback temperature of the electrical machine to less than about 200° C. using the cooling blower assembly.

25. The method of any preceding clause further comprising activating the cooling blower assembly for up to two hours.

26. The method of any preceding clause further comprising activating the cooling blower assembly for more than thirty minutes.

27. The method of any preceding clause further comprising activating the cooling blower assembly for up to one hour.

28. The method of any preceding clause, wherein the electrical machine is located in an enclosure at least partially formed by a thermal shield that at least partially encloses the electrical machine, the enclosure at least partially defining a cooling airflow path within the enclosure, the method further comprising dividing the cooling airflow path into multiple cooling airflow paths.

29. The method of any preceding clause, wherein the step of dividing the cooling airflow paths includes providing a first cooling airflow path with a first percentage of total airflow and a second cooling airflow path having a second percentage of total airflow that is same as or different than the first percentage of total airflow.

30. The method of any preceding clause, wherein a cooling duct is in communication with the cooling blower assembly by a main duct, the cooling duct in communication with the cooling airflow path such that the air flows along the cooling airflow path.

31. The method of any preceding clause, wherein the main duct is in communication with a fan bypass duct that is in communication with a fan bypass flow path, the method further comprising directing only a portion of cooling air flowing through the fan bypass duct from the fan bypass duct through the main duct.

32. The method of any preceding clause, wherein the main duct is in communication with a fan bypass flow path.

33. A method comprising: using an engine comprising a core cowl, an undercowl space, and a compressor in fluid communication with a downstream combustor and turbine; operating the engine; shutting the engine down; and after or during engine shutdown, operating a blower disposed in the undercowl space, therein forced air produced by the blower passes through at least one cooling duct, the cooling duct including an end located adjacent to an electrical machine to provide cooling air generated by the blower to the electrical machine.

34. The method of any preceding clause, whereupon after shutdown operating the blower for a period of time that maintains a peak soakback temperature of the electrical machine to less than about 200° C.

35. The method of any preceding clause further comprising activating the blower for up to two hours.

36. The method of any preceding clause further comprising activating the blower for more than thirty minutes.

37. The method of any preceding clause further comprising activating the blower for up to one hour.

38. The method of any preceding clause, wherein the end of the duct is coupled to an enclosure that at least partially encloses the electrical machine.

39. The method of any preceding clause, wherein the engine comprises a bypass duct, the method further comprising opening a valve to the bypass duct, thereby placing the blower in fluid communication with the bypass duct.

40. The method of any preceding clause, wherein the bypass duct is a fan bypass duct.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A gas turbine engine comprising:
   a fan located at a forward portion of the gas turbine engine;
   a compressor section and a turbine section arranged in serial flow order, the compressor section and the turbine section together defining a core airflow path;
   a rotary member rotatable with at least a portion of the compressor section and with at least a portion of the turbine section;
   an electrical machine coupled to the rotary member and located at least partially inward of the core airflow path in a radial direction;
   an enclosure that at least partially encloses the electrical machine, the enclosure at least partially defining a cooling airflow path within the enclosure;
   a cooling air bypass duct having opposite ends in communication with a main duct, the cooling air bypass duct comprising a cooling blower assembly located in an undercowl space that is in communication with a cooling duct, the cooling duct in communication with the cooling airflow path such that air flows along the cooling airflow path, wherein the cooling duct is in communication with the main duct that receives the air from the cooling blower assembly, the main duct in communication with a fan bypass duct;
   a valve assembly connected to the main duct having an open configuration that allows cooling airflow by the valve assembly through the main duct and a closed configuration that inhibits cooling airflow by the valve assembly through the main duct, wherein the valve assembly comprises a valve that is located between the opposite ends of the cooling air bypass duct; and
   one or more controllers that close the valve and activate the cooling blower assembly upon deactivation of the gas turbine engine such that the air flows through the cooling air bypass duct.

2. The gas turbine engine of claim 1, wherein the cooling blower assembly receives power from an aircraft or a power source dedicated for the cooling blower assembly.

3. The gas turbine engine of claim 1, wherein the cooling duct provides the air to multiple outlets that provide multiple cooling airflow paths within the enclosure.

4. A method comprising:
   using a gas turbine engine, the gas turbine engine comprising:
      a core cowl, an undercowl space;
      a fan located at a forward portion of the gas turbine engine;
      a compressor section in fluid communication with a downstream combustor and turbine section arranged in serial flow order, the compressor section and the turbine section together defining a core airflow path;
      a rotary member rotatable with at least a portion of the compressor section and with at least a portion of the turbine section;
      an electrical machine coupled to the rotary member and located at least partially inward of the core airflow path in a radial direction;
      an enclosure that at least partially encloses the electrical machine, the enclosure at least partially defining a cooling airflow path within the enclosure;
      a cooling air bypass duct having opposite ends in communication with a main duct, the cooling air bypass duct comprising a cooling blower assembly located in an undercowl space that is in communication with at least one cooling duct, the at least one cooling duct in communication with the cooling airflow path such that air flows along the cooling airflow path, wherein the at least one cooling duct is in communication with the main duct that receives the air from the cooling blower assembly, the main duct in communication with a fan bypass duct;

a valve assembly connected to the main duct having an open configuration that allows cooling airflow by the valve assembly through the main duct and a closed configuration that inhibits cooling airflow by the valve assembly through the main duct, wherein the valve assembly comprises a valve that is located between the opposite ends of the cooling air bypass duct; and one or more controllers that close the valve and activate the cooling blower assembly upon deactivation of the gas turbine engine such that the air flows through the cooling air bypass duct;

operating the gas turbine engine;

shutting the gas turbine engine down; and after or during gas turbine engine shutdown, operating the cooling blower disposed in the undercowl space, therein the air produced by the cooling blower passes through the at least one cooling duct, the at least one cooling duct including an end located adjacent to the electrical machine to provide the air generated by the cooling blower to the electrical machine.

5. The method of claim 4, whereupon after shutdown operating the cooling blower for a period of time that maintains a peak soakback temperature of the electrical machine to less than about 200° C.

6. The method of claim 4 further comprising activating the cooling blower for up to two hours.

7. The method of claim 4 further comprising activating the cooling blower for more than thirty minutes.

8. The method of claim 4 further comprising activating the cooling blower for up to one hour.

* * * * *